United States Patent [19]

Mandin et al.

[11] Patent Number: 5,214,926
[45] Date of Patent: Jun. 1, 1993

[54] DEVICE, ESPECIALLY AUTONOMOUS AND PORTABLE FOR EXTRACTING HEAT FROM A HOT SOURCE

[75] Inventors: Cyril Mandin, Paris; Olivier Thomas, Leuville Sur Orge; Laurent Simionesco, St Cloud, all of France

[73] Assignee: Dassault Aviation, Paris, France

[21] Appl. No.: 776,783

[22] Filed: Oct. 18, 1991

[30] Foreign Application Priority Data

Oct. 18, 1990 [FR] France ................. 90 12891

[51] Int. Cl.⁵ .............................................. F17C 5/00
[52] U.S. Cl. ................................. 62/54.2; 62/259.3; 252/70
[58] Field of Search .............. 62/259.3, 54.2, 384, 62/437, 430; 252/67, 70

[56] References Cited

U.S. PATENT DOCUMENTS

| | | | |
|---|---|---|---|
| 3,000,190 | 9/1961 | Stark | 62/259.3 |
| 3,744,555 | 7/1973 | Fletcher et al. | 62/259.3 |
| 4,405,348 | 9/1983 | Pasternack | 62/259.3 |
| 4,507,941 | 4/1985 | Lester et al. | 62/54.2 |
| 4,998,415 | 3/1991 | Larsen | 62/259.3 |
| 5,014,355 | 5/1991 | Vollenweider, II | 62/259.3 |

FOREIGN PATENT DOCUMENTS 63-202687 8/1988 Japan .
2032255 5/1980 United Kingdom .

*Primary Examiner*—John M. Sollecito
*Attorney, Agent, or Firm*—Stevens, Davis, Miller & Mosher

[57] ABSTRACT

Device for extracting heat from a hot source (7) and transferring it to an autonomous heat accumulator, which is portable, forming a cold source, this device having the special feature that the said accumulator is formed by an enclosure (1) containing ammonia under conditions such that at least a significant portion of the heat transferred to this accumulator causes the ammonia to pass from the solid state to the liquid state. The device is usable for the thermal control of protective equipment or of leakproof protective suits intended for work in a toxic atmosphere or at high temperature, or also in space.

14 Claims, 1 Drawing Sheet

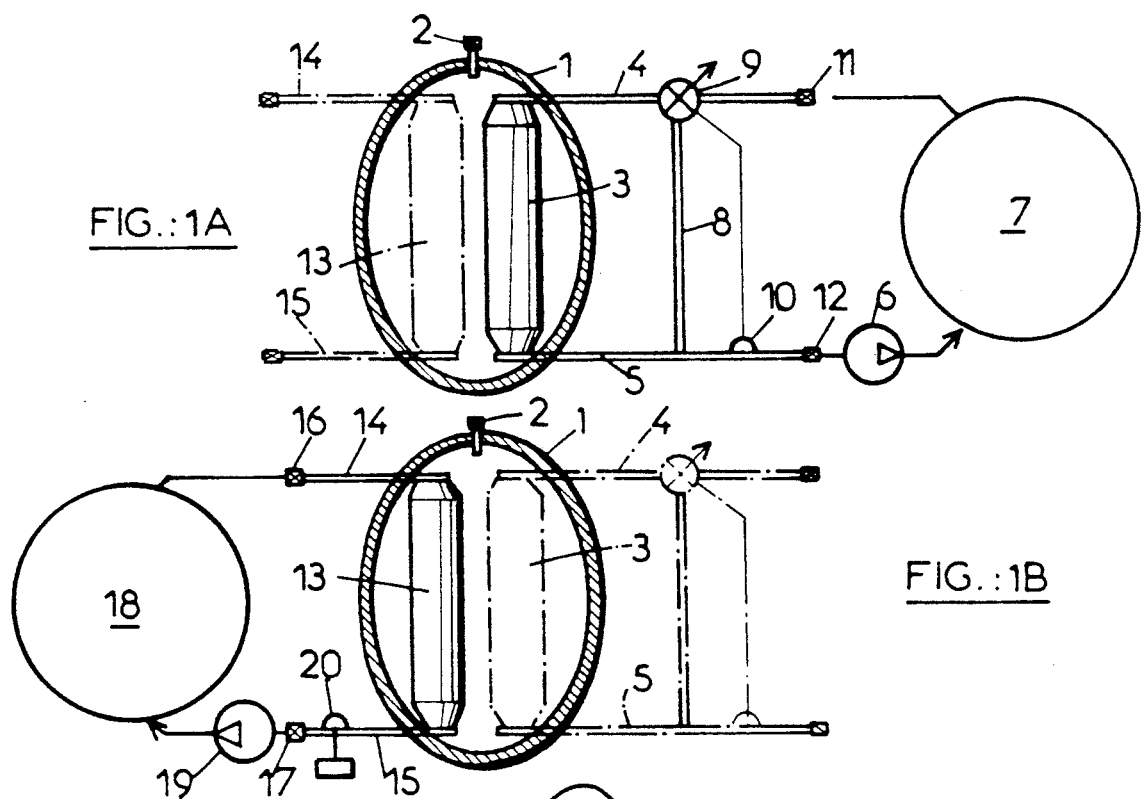
FIG.:1A
FIG.:1B
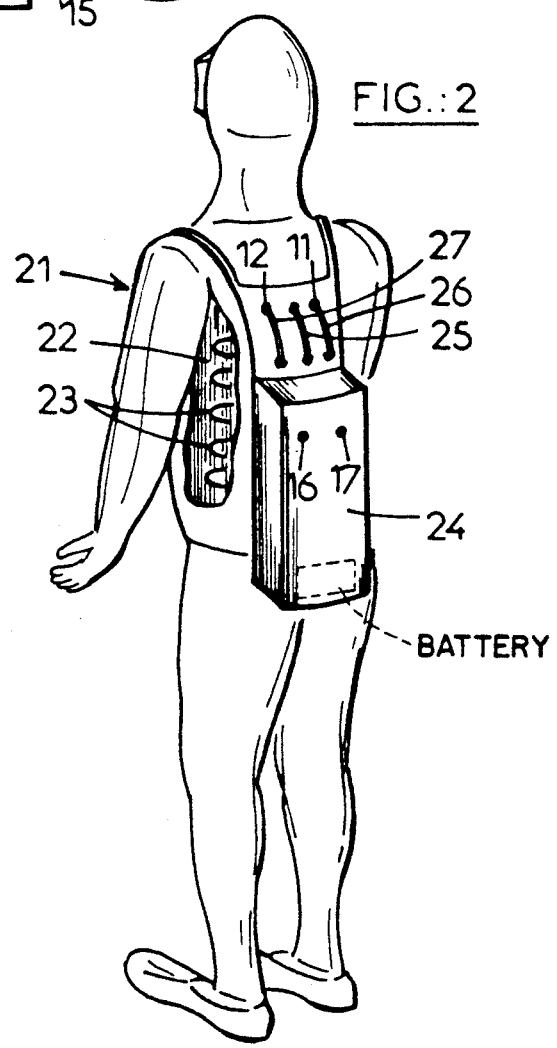
FIG.:2
BATTERY 5,214,926

DEVICE, ESPECIALLY AUTONOMOUS AND PORTABLE FOR EXTRACTING HEAT FROM A HOT SOURCE

BACKGROUND OF THE INVENTION

The present invention relates to a device, especially autonomous and portable, for extracting heat from a hot source.

The invention has been developed in the course of research intended for providing the protection of personnel operating in protective suits in a toxic environment with very high temperature conditions. For example such conditions arise while fighting fires or while working in a polluted medium. In this case, the person is equipped with a protective suit which protects him effectively against toxic substances and against external heat, but the internal heat originating from the body of the operator himself cannot be removed, so that the temperature inside the protective suit can rise to levels which exceed acceptable limits. A continuous connection between the inside of the protective suit and a coupling source, which is not transportable by the wearer, is not desirable as it eliminates the autonomy of the protective suit. A heat accumulator can form an autonomous cold source.

The invention is also applicable to a spacesuit for extra-vehicular activity where the removal of metabolic heat from the astronaut arises in the same manner.

The invention can also find applications in cases where it is essential to ensure that equipment or articles, for example biological specimens, should have a temperature which remains within fixed limits, even in the event of a momentary interruption in the communication with an energy source.

In order to solve this problem, it springs to mind completely naturally to use substances known in refrigerating systems, for example carbon dioxide or compounds of the "Freon" family. However, these commonly used substances essentially absorb heat by passing from the solid or liquid state to the gaseous state. This change of state corresponds to a very large volume change, and results in very bulky materials or in the necessity of a supply of mechanical energy (refrigerators).

It would be possible to imagine making the gaseous phase escape into the atmosphere, in particular in the case of carbon dioxide, but that can lead to a considerable increase in the cost and in the complexity of the apparatus for reconditioning the accumulator, as well as to the emission of reactive or toxic vapours.

SUMMARY OF THE INVENTION

The invention consequently provides a device for extracting heat from a hot source and transferring it to an autonomous heat accumulator, which is portable, forming a cold source. This device has the special feature that the accumulator is formed by an enclosure containing ammonia under conditions such that at least a significant portion of the heat transferred to this accumulator causes the ammonia to pass from the solid state to the liquid state.

A further portion of the heat may be absorbed by further heating the liquid ammonia originating from the melting of the solid ammonia.

In practice, it is advantageous that the enclosure be hermetically sealed. This makes is possible to guard against reactive and toxic discharges and prevents undesirable pollution. This is especially desirable in space, in the case of a protective suit for extra-vehicular activity.

At atmospheric pressure, ammonia is in the solid state at a temperature of the order of $-78°$ C.

If this solid NH, is placed in contact with a hot source, it will melt, that is to say it passes from the solid state to the liquid state and transfers a quantity of heat, from the hot source to the ammonia, equal to the product of its mass times the latent heat of fusion, $L = 339$ KJ/kg.

When all the ammonia has melted, and if the contact with the hot source is maintained, the liquid ammonia thus formed will consequently be heated further up to the temperature of the hot source $T_o$, and therefore exchange of a quantity of heat, from the hot source to the $NH_3$, proportional to the specific heat of liquid $NH_3$, to its mass and to the temperature difference between the initial and final states of the liquid.

The operation of such a principle in order to adapt it to a cooling system which can be used in an autonomous manner and without danger to the human being makes it possible therefore to:

ensure the heat transfer from the hot source (user) to the $NH_3$, guard against the toxic effects of ammonia.

Preferably, the device comprises a hot circuit containing a liquid coolant and able to connect a "hot" exchanger, in contact with the ammonia, to the hot source.

According to this mode, there is a requirement for, on the one hand, ammonia in order to form the accumulator and, on the other hand, a liquid coolant for transferring the heat. In this case the ammonia can be isolated from the user, which reduces the risk of contact of the latter with this toxic product, and the heat transfer may be ensured by an appropriate liquid coolant, which may be harmless, the other conditions which it should fulfill is that it should not solidify except below $-78°$ C. and not volatilise at the highest operating temperatures.

After the solid ammonia has passed into the liquid state, it is preferable to be able to reuse it after it has been made to pass back into the solid state. There may be provided for this a separate apparatus, but, according to a preferred mode, a second exchanger, in contact with the ammonia, may be connected to a cold source via a cold circuit so as to resolidify the molten ammonia, this operation forming the thermal recharging of the accumulator.

The sealed enclosure containing the ammonia, the hot exchanger and, where appropriate, the cold exchanger, form a system which is transportable and capable of carrying out the exchange from the hot source to the accumulator in an autonomous manner.

Advantageously the use may be contemplated of a single exchanger and a single circuit for utilisation and regeneration: connection to the hot source for utilisation, connection to a cold source for regeneration. However, this simpler solution imposes certain additional constraints concerning the liquid coolant, which must be compatible with the entire range of temperatures used.

BRIEF DESCRIPTION OF THE DRAWING

The invention will now be explained in more detail with the aid of a practical example comprising a protective suit, illustrated with the aid of the drawings, where:

FIGS. 1A and 1B are basic diagrams of the apparatus, under autonomous operation and under regeneration, respectively.

FIG. 2 is a simplified view, in perspective, of the protective suit and of its accessories according to the invention.

DETAILED DESCRIPTION OF AN EMBODIMENT OF THE INVENTION

The essential element of an apparatus according to the invention is a sealed enclosure 1 filled with ammonia.

The enclosure 1 is dimensioned in order to withstand the forces generated by the phase changes of the ammonia.

Numeral 2 denotes a valve for filling the enclosure.

A first exchanger 3, called the "hot exchanger", is contained inside the enclosure. It may be formed by a series of tubes which are connected to an inlet pipe 4 and an outlet pipe 5 and are immersed in the ammonia inside the enclosure. The outer surface of the enclosure may also be used as an exchange surface, the hot circuit and the liquid coolant then not requiring any traversal of the partition of the enclosure. A pump 6 circulates the liquid coolant, which is "COOLANOL 15" from the MONSANTO Company, between the exchanger 3 and the hot source 7. In place of the liquid which has just been mentioned, it is also possible to use "FLUORINERT-FC77" marketed by the 3M-FRANCE Company, or any product meeting the following requirements:

freezing point less than $-78°$ C. with a low viscosity at this temperature, saturation vapour pressure at $+50°$ C. (for example) less than $10^5$ Pa absolute, no toxic vapour or gas discharge.

In FIG. IA is shown a by-pass 8 which connects the inlet and outlet pipes 4 and 5. This by-pass is equipped with a valve 9, controlled by a sensor 10 sensitive to the temperature of the liquid coolant in the outlet pipe 5, so as to regulate the outlet temperature.

On the pipes 4 and 5 are provided disconnectable and auto-closing connections 11 and 12 which make it possible to isolate the enclosure and the hot source 7 from one another.

Once the ammonia contained in the enclosure 1 has passed completely from the solid state to the liquid state, and the liquid ammonia has been heated further, provision may be made for discarding the enclosure I, but in practice it is more advantageous to regenerate it. In order to do this, in accordance with FIG. IB, the enclosure 1 contains a second exchanger 13, called the "cold exchanger", provided also with inlet and outlet pipes 14 and 15, and which may be connected via disconnectable and auto-closing connections 16 and 17 to a cold source 18. Associated with the cold source is a circulating pump 19 which moves the liquid coolant of this second circuit. This second circuit may be coincident with the hot circuit mentioned hereinabove, it being possible for this circuit to be connected, alternately, to the hot source in the course of utilisation and then to the cold source in the course of regeneration. In this case, the liquid coolant used for regeneration is the same as that of the hot circuit, that is to say COOLANOL 15. In the case where it differs from the hot circuit, the cold circuit may be supplied with liquid nitrogen or with liquefied natural gas, so that the cold circuit, or regeneration circuit, will then operate over a temperature range encompassing the temperatures of $-78°$ C. and $-191°$ C. (for liquid nitrogen), and therefore different from that of the hot circuit, which encompasses the temperatures of $-78°$ C. and $+30°$ C. approximately. In the course of regeneration, the pump 19 is switched on, until a sensor 20 placed on the outlet pipe of the exchanger 13 shows that the temperature of the latter is such that the ammonia has solidified. The enclosure 1 is then ready for reuse.

In FIGS. IA and IB the circuit which is not in operation is shown by dot-dash lines, that is to say the cold circuit 13, 14, 15 for FIG. 1A and the hot circuit 3, 4, 5 for FIG. 1B.

FIG. 2 shows a protective suit intended for equipping the personnel sent to fight a fire or to operate in a toxic medium.

The protective suit 21 itself is of conventional type for this kind of operation, that is to say it is constructed from material having high-performance thermal insulation and leakproof properties. Inside the protective suit, the operator wears a refrigerating garment 22, that is to say a garment whose fabric comprises a certain number of small tubes 23, uniformly distributed, and which are coursed by the liquid coolant. The wearer of the protective suit wears on his back a refrigeration block 24 protected by means of an insulating cover (not shown). The refrigeration block 24 contains not only the enclosure 1 but also rechargeable batteries (not shown) intended for powering the pump 6, the sensor 10 and the thermostatted valve 9, which are not visible in FIG. 2 but are placed inside the protective suit. An electric lead 25 connects the rechargeable batteries to the pump, while hoses 26, 27, which form part of the pipes 4 and 5, are connected to the autoclosing connections 11 and 12. In practice, for reasons of quick changing, and therefore of safety, a multiple connection brings the connections 11, 12 and 27 together. The auto-closing connections 16 and 17 which enable the enclosure 1 to be connected to the cold source for regeneration are shown on the housing of the block 24. It will be recalled that the assembly formed by the housing 24 and the various connections is protected by a cover or an enclosure isolated from the ambient heat, whilst being independent of the inside of the protective suit. Thus, damage to the enclosure 1 would consequently not involve ammonia entering the protective suit itself.

The assembly of an apparatus for fire-fighting or for operating in a toxic medium comprises a certain number of protective suits and at least an equal, or preferably very much greater, number of housings 24 together with a regeneration apparatus which may, as appropriate, be supplied with liquid nitrogen, with liquefied natural gas or any other refrigeration means capable of providing temperatures lower than those of the solidification of ammonia.

According to a further embodiment of the invention, the device is especially designed for the control of the environment of equipment or of articles, such as biological specimens, the temperature of which must remain within precise limits even during transporting or during an interruption of connection with an energy source.

We claim:

1. A device for extracting heat from a hot source and transferring it to an autonomous portable heat accumulator, which defines a cold source, said accumulator comprising an enclosure containing solid ammonia means for maintaining said solid ammonia under conditions of temperature and pressure such that at least a significant portion of the heat transferred to said accumulator from said hot source is absorbed by said ammonia and causes the ammonia to transform from the solid state to the liquid state and means for providing that substantially all the ammonia is transformed into the liquid state; said pressure being close to the equilibrium pressure between the solid and liquid states of ammonia.

2. The device of claim 1, in which the properties of ammonia permit further absorption of heat from the accumulator thus further heating the liquid ammonia originating from the melting of the solid ammonia.

3. The device of claim 1, in which said enclosure is hermetically sealed.

4. The device of claim 1, further comprising a hot circuit containing a first liquid coolant for transferring said heat from said hot source to said heat accumulator; said hot circuit being connectable with said heat accumulator.

5. The device of claim 4, further comprising a cold circuit containing a second liquid coolant; said cold circuit being connectable with said heat accumulator, whereby said ammonia is in contact with said cold circuit so as to resolidify the liquid ammonia, thereby forming a thermal recharging of the accumulator.

6. The device of claim 5, wherein said heat accumulator may be disconnected from the hot source and connected to said cold circuit so as to resolidify the liquid ammonia, thereby forming a thermal recharging of the accumulator.

7. The device of claim 4, wherein said hot circuit comprises a temperature regulation means and a circulating pump.

8. The device of claim 7, wherein said hot circuit is connected to a refrigerating garment means comprising a series of tubes and worn by an operator for ensuring his comfort or survival in a hot environment.

9. The device of claim 8, wherein said refrigerating garment means is provided with pipes comprising auto-closing connections traversing a wall of a protective suit for connecting said refrigerating garment to said heat accumulator.

10. The device of claim 8 further comprising rechargeable or replaceable cells or batteries for powering a circulating pump for circulating said first liquid coolant of the hot circuit.

11. The device of claim 1, for controlling the environment of equipment or articles, such as biological specimens, wherein the temperature of said equipment or articles must remain within precise limits even during transportation or an interruption of a power supply.

12. A device for extracting heat from an interior of a protective suit, comprising:
circulation means, circulating a first liquid coolant throughout said protective suit, for extracting heat from said protective suit;
a heat accumulator comprising an enclosure in fluid communication with said circulation means containing solid ammonia, means for causing said solid ammonia to transform from said solid state to a liquid state thereby extracting heat from said first liquid.

13. A protective suit for use in hot environments, comprising:
a refrigerating garment means, worn by a user, comprising a series of tubes for circulating a first liquid coolant;
a heat exchanger means, in fluid communication with said refrigerating garment means, for extracting heat from said first liquid coolant, comprising
a hermetically sealed enclosure containing a predetermined amount of solid ammonia under conditions of temperature and pressure such that said ammonia does not sublime;
said refrigerating garment means and said heat exchange means define means for delivering heat to said heat exchanger means from said liquid coolant and causing said solid ammonia to transform to the liquid state.

14. A protective suit for use in hot environments, comprising:
a refrigerating garment means, worn by a user, comprising a series of tubes for circulating a first liquid coolant;
a heat exchanger means, in fluid communication with said refrigerating garment means, for extracting heat from said first liquid coolant, comprising
a hermetically sealed enclosure containing a predetermined amount of solid ammonia under conditions of temperature and pressure such that said ammonia does not sublime;
said refrigerating garment means and said heat exchange means define means for delivering heat to said heat exchanger means from said liquid coolant and causing said solid ammonia to transform to the liquid state;
a hot circuit unit, operatively connecting said refrigerating garment means to said heat exchanger means, comprising
auto-closing connector means for removably connecting said hot circuit unit and said refrigerating garment means,
temperature control means for controlling the temperature of the first liquid coolant discharged to said refrigerating garment means comprising a by-pass valve operatively controlled by a temperature sensor, and
a circulating pump means for circulating said first liquid coolant; and
a cold circuit unit selectively in fluid communication with said heat exchanger for resolidifying the liquid ammonia into solid ammonia, comprising
auto-closing connector means for removable connecting said cold circuit and said heat exchanger means,
a second liquid coolant having a temperature lower than the solidification temperature of ammonia,
a circulating pump means for circulating said second liquid coolant,
a control means for controlling said circulating pump means to cease operation when the ammonia has substantially resolidified comprising a temperature sensor means for sensing the temperature of the second liquid coolant means.

* * * * *